United States Patent
Barrau et al.

(10) Patent No.: US 12,130,505 B2
(45) Date of Patent: Oct. 29, 2024

(54) OPHTHALMIC LENS FOR IMPROVING VISION

(71) Applicant: ESSILOR INTERNATIONAL, Charenton-le-pont (FR)

(72) Inventors: Coralie Barrau, Charenton-le-pont (FR); Elise Poletto, Charenton-le-pont (FR); Jean-Philippe Dumont, Charenton-le-pont (FR); Christelle Marck, Charenton-le-pont (FR); Céline Robin, Charenton-le-pont (FR); Valérie Jacquemin, Charenton-le-pont (FR); Elliot French, Dallas, TX (US)

(73) Assignee: Essilor International, Charenton-le-pont (FR)

( * ) Notice: Subject to any disclaimer, the term of this patent is extended or adjusted under 35 U.S.C. 154(b) by 786 days.

(21) Appl. No.: 17/280,701

(22) PCT Filed: Sep. 26, 2019

(86) PCT No.: PCT/EP2019/076106
§ 371 (c)(1),
(2) Date: Mar. 26, 2021

(87) PCT Pub. No.: WO2020/064963
PCT Pub. Date: Apr. 2, 2020

(65) Prior Publication Data
US 2022/0113559 A1    Apr. 14, 2022

(30) Foreign Application Priority Data
Sep. 27, 2018    (EP) ..................... 18306266

(51) Int. Cl.
*G02C 7/10*    (2006.01)
*G02C 7/02*    (2006.01)

(52) U.S. Cl.
CPC ............. *G02C 7/104* (2013.01); *G02C 7/028* (2013.01); *G02C 7/107* (2013.01); *G02C 7/108* (2013.01)

(58) Field of Classification Search
CPC . G02C 7/10; G02C 7/02; G02C 7/104; G02C 7/105; G02C 7/102; G02C 7/107;
(Continued)

(56) References Cited

U.S. PATENT DOCUMENTS

| | | |
|---|---|---|
| 5,235,358 A | 8/1993 | Mutzhas et al. |
| 5,470,932 A | 11/1995 | Jinkerson |

(Continued)

FOREIGN PATENT DOCUMENTS

| | | |
|---|---|---|
| WO | WO 1990/005321 | 5/1990 |
| WO | WO 2013/188825 | 12/2013 |

(Continued)

OTHER PUBLICATIONS

Office Action issued in corresponding Chinese Application No. 201980058707.9, dated Apr. 24, 2022 (Chinese Only).
(Continued)

*Primary Examiner* — Jie Lei
(74) *Attorney, Agent, or Firm* — Norton Rose Fulbright US LLP

(57) ABSTRACT

This ophthalmic lens for improving vision has a light cut factor CutLED between 32% and 90%, for wavelengths ranging from 380 nm to 500 nm, defined by formula (I), where Σ is a discrete or continuous sum operator, λ is the wavelength in nm, lens T % is the spectral transmittance of the lens in % and LED emission is the spectral distribution of a white light emitting diode; a mean luminous transmittance in the visible range higher than or equal to 75%; and light transmitted through the ophthalmic lens has a colori-
(Continued)

metric value b*, as defined in the colorimetric CIE L*a*b* with illuminant D65, lower than 25.

19 Claims, 4 Drawing Sheets

(58) Field of Classification Search
CPC ........ G02C 7/108; G02C 7/028; G02C 7/027; G02B 1/00; G02B 1/11; G02B 1/116; G02B 5/26; G02B 5/28; G02B 5/22; G02B 5/226; B29D 11/00; B29D 11/00009; B29D 11/00634; B29D 11/00903
USPC .............. 351/159.6, 159.01, 159.74, 159.73, 351/159.65, 159, 163, 177; 359/581, 589, 359/885
See application file for complete search history.

(56) References Cited

U.S. PATENT DOCUMENTS

2015/0316688 A1* 11/2015 Cefalo .................... G02B 1/14 252/586

2017/0219848 A1    8/2017 Kraus et al.
2017/0261768 A1*   9/2017 Ambler .................. G02C 7/104

FOREIGN PATENT DOCUMENTS

WO    WO 2016/146153    9/2016
WO    WO 2017/077357    5/2017

OTHER PUBLICATIONS

Extended European Search Report issued by the European Patent Office in corresponding Application No. EP 18 30 6266 mailed on Apr. 1, 2019.
International Search Report and Written Opinion issued in corresponding International application No. PCT/EP2019/076106 mailed on Apr. 2, 2020.
Spanard, Jan-Marie, "LED Light Spectrum Enhancement with Transparent Pigmented Glazes"—*LED professional—LED Lighting Technology, Application Magazine*, Retrieved from the Internet: URL: < https://www.led-professional.com/resources-1/articles/led-light-spectrum-enhancement-with-transparent-pigmented-glazes-by-light-spectrum-glazes>, Jul. 6, 2016.

* cited by examiner

OPHTHALMIC LENS FOR IMPROVING VISION

CROSS-REFERENCE TO RELATED APPLICATIONS

This application is a national phase application under 35 U.S.C. § 371 of International Application No. PCT/EP2019/076106 filed 26 Sep. 2019, which claims priority to European Patent Application No. 18306266.0 filed 27 Sep. 2018. The entire contents of each of the above-referenced disclosures is specifically incorporated by reference herein without disclaimer.

FIELD OF THE INVENTION

The present invention relates to an ophthalmic lens for improving vision. The present invention is directed in particular to persons suffering from cataract.

BACKGROUND OF THE INVENTION

Persons suffering from cataract usually complain about glare, a hazy vision, halos around lights and a decrease of visual acuity. The higher the cataract level, the higher the glare. In particular, persons suffering from cataract are annoyed by light when driving at night. For instance, headlights from oncoming cars may cause disability glare, especially because cataract people have a higher intraocular scattering.

However, today, there is no satisfactory ophthalmic filtering solution adapted to reduce the disability glare and the visual discomfort before a patient undergoes cataract surgery. Yet, the waiting time period before cataract surgery can be of several months, or even years.

U.S. Pat. No. 5,235,358 (Mutzhas) describes a lens having a light filter for improving vision for people suffering from cataract having a mean transmittance of at most 20% in the 380 nm to 450 nm spectral range and a very high level of cut at 450 nm. Such kind of lenses have actually a limited efficiency if any.

Thus, there is a need for an ophthalmic filtering solution that helps reducing the disability glare experienced by persons suffering from cataract and that improves visual acuity and comfort before surgery under bothering lights.

This amounts to achieving a suitable rejection level of short wavelengths of the visible spectrum coming e.g. from car headlights, artificial lighting and outdoors while maintaining a high level of mean luminous transmittance Tv, suitable for a permanent wear, Tv being defined in ISO 13666 standard as the ratio of the luminous flux transmitted by a lens to the incident luminous flux, the lens having preferably an acceptable aesthetics (especially a low level of coloration) and a sufficiently high transparency.

Short wavelengths enhance light scattering which is exacerbated by the high intraocular scattering of eyes with cataract.

SUMMARY OF THE INVENTION

An object of the invention is to overcome the above-mentioned drawbacks of the prior art.

To that end, the invention provides an ophthalmic lens for improving vision, remarkable in that it has:

a light cut factor CutLED between 32% and 90%, for wavelengths ranging from 380 nm to 500 nm, defined by:

$$CutLED = 100 - \frac{\sum_{\lambda=380}^{500}(\text{lens } T\% \times LED \text{ emission})}{\sum_{\lambda=380}^{500} LED \text{ emission}}$$

where $\Sigma$ is a discrete or continuous sum operator, $\lambda$ is the wavelength in nm, lens T % is the spectral transmittance of the lens in % and LED emission is the spectral distribution of a white light emitting diode;

a mean luminous transmittance in the visible range higher than or equal to 75%, preferably higher than or equal to 78%, more preferably higher than or equal to 80%, even more preferably higher than or equal to 82%; and light transmitted through the ophthalmic lens has a colorimetric value b*, as defined in the colorimetric CIE L*a*b* with illuminant D65, lower than 25, preferably lower than or equal to one of the following values 20, 19, 18, 17, 16, more preferably lower than or equal to 15, and even more preferably lower than or equal to 13.

Therefore, the ophthalmic lens according to the invention has combined absorption and transmission properties which make it possible both to reduce disability glare and halos experienced by cataract people by rejecting a moderate percentage of short wavelengths from sources of harsh light such as light-emitting diode (LED) sources and to maintain a suitable visual comfort, transparency and aesthetics for a prolonged or permanent wear.

Vision and quality of life are thus significantly improved for persons suffering from cataract while waiting for surgery.

The invention also provides a method for obtaining an ophthalmic lens as succinctly described above, remarkable in that it comprises a step of tinting the lens by applying a sublimation process, an imbibition process, a dip coating process, a lamination process or by mixing a light absorbing dye in a substrate composition.

Another way is to obtain the required CutLED level by using a filtering/rejecting interferential layer or by using a combination of absorption and interferential layers.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF THE INVENTION

Figure 1:
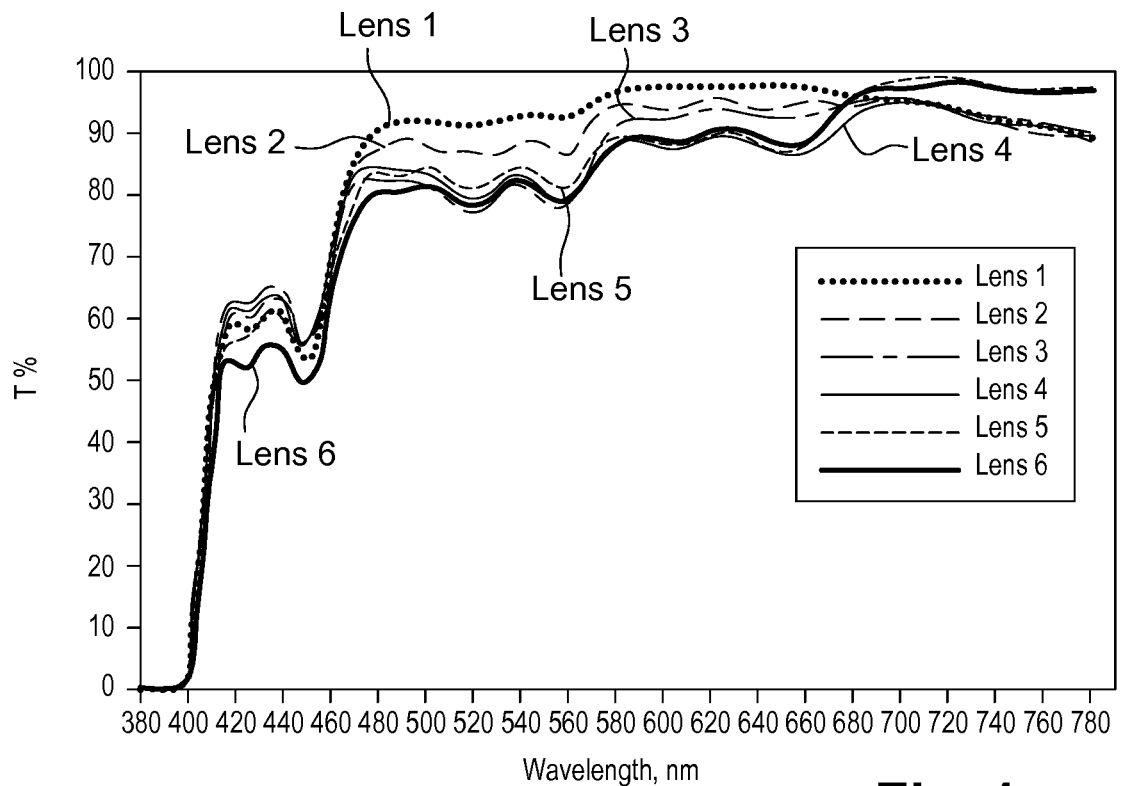
FIG. 1 is a set of graphs showing the transmission spectra of a plurality of ophthalmic lens prototypes according to the invention, in a particular embodiment.

In the description which follows, the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may embodied in a wide variety of contexts. Embodiments discussed herein are merely representative and do not limit the scope of the invention. It will also be obvious to one skilled in the art that all the technical features that are defined relative to a process can be transposed, individually or in combination, to a device and conversely, all the technical features relative to a device can be transposed, individually or in combination, to a process.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises", "has", "contains", or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about".

Also unless otherwise indicated, the indication of an interval of values "from X to Y" or "between X and Y", according to the present invention, means including the values of X and Y.

In the present application, when an ophthalmic lens comprises one or more coatings onto the surface thereof, the expression "to deposit a layer or a coating onto the lens" is intended to mean that a layer or a coating is deposited onto the external (exposed) surface of the outer coating of the lens, that is to say its coating that is the most distant from the substrate.

A coating that is said to be "on" a substrate or deposited "onto" a substrate is defined as a coating which (i) is positioned above the substrate, (ii) is not necessarily in contact with the substrate, that is to say one or more intermediate coatings may be arranged between the substrate and the coating in question, and (iii) does not necessarily completely cover the substrate.

In a preferred embodiment, the coating on a substrate or deposited onto a substrate is in direct contact with the substrate.

As used herein, the rear (or the inner) face of the substrate is intended to mean the face which, when using the lens, is the nearest from the wearer's eye. It is generally a concave face. On the contrary, the front face of the substrate, is the face which, when using the lens, is the most distant from the wearer's eye. It is generally a convex face.

In addition, the "angle of incidence (symbol $\theta$)" is the angle formed by a ray light incident on an ophthalmic lens surface and a normal to the surface at the point of incidence. The ray light is for instance an illuminant light source, such as the standard illuminant D65 as defined in the international colorimetric CIE L*a*b*. Generally the angle of incidence changes from 0° (normal incidence) to 90° (grazing incidence). The usual range for angle of incidence is from 0° to 75°.

Without any specific indication, the colorimetric coefficients of the ophthalmic lens of the invention in the international colorimetric system CIE L*a*b* are calculated between 380 nm and 780 nm, taking the standard illuminant D65 and the observer into account (angle of 10°). The observer is a "standard observer" as defined in the international colorimetric system CIE L*a*b*.

Generally speaking, the interferential coating of the ophthalmic lens according to the invention, which will be called "the antireflective coating", may be deposited onto any substrate, and preferably onto organic lens substrates, for example a thermoplastic or thermosetting plastic material.

Thermoplastic may be selected from, for instance: polyamides; polyimide; polysulfones; polycarbonates and copolymers thereof; poly(ethylene terephthalate) and polymethylmethacrylate (PMMA).

Thermoset materials may be selected from, for instance: cycloolefin copolymers such as ethylene/norbornene or ethylene/cyclopentadiene copolymers; homo- and copolymers of allyl carbonates of linear or branched aliphatic or aromatic polyols, such as homopolymers of diethylene glycol bis(allyl carbonate) (CR 39®); homo- and copolymers of (meth)acrylic acid and esters thereof, which may be derived from bisphenol A; polymer and copolymer of thio(meth) acrylic acid and esters thereof, polymer and copolymer of allyl esters which may be derived from bisphenol A or phtalic acids and allyl aromatics such as styrene, polymer and copolymer of urethane and thiourethane, polymer and copolymer of epoxy, and polymer and copolymer of sulphide, disulfide and episulfide, and combinations thereof.

As used herein, a (co)polymer is intended to mean a copolymer or a polymer. As used herein, a (meth)acrylate is intended to mean an acrylate or a methacrylate. As used herein, a polycarbonate (PC) is intended to mean either homopolycarbonates or copolycarbonates and block copolycarbonates.

Homopolymers of diethylene glycol bis(allyl carbonate) (CR39®), allylic and (meth)acrylic copolymers, having a refractive index between 1.54 and 1.58, polymer and copolymer of thiourethane, polycarbonates are preferred.

The substrate may be coated with one or more functional coatings prior to depositing the antireflective coating of the invention. These functional coatings traditionally used in optics may be, without limitation, an impact-resistant primer layer, an abrasion-resistant coating and/or a scratch-resistant coating, a polarizing coating, a photochromic coating or a tinted coating. In the following, a substrate means either a bare substrate or such a coated substrate.

Prior to depositing the antireflective coating, the surface of said substrate is usually submitted to a physical or chemical surface activating treatment, so as to reinforce the adhesion of the antireflective coating. Such pre-treatment is generally conducted under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma. It may also be an acid or basic treatment and/or a solvent-based treatment (water, hydrogen peroxide or any organic solvent).

In order to quantify the cutting of short wavelengths i.e. blue light coming for example from car LED headlights, a parameter called the light cut factor CutLED can be used. CutLED is defined as follows:

$$CutLED = 100 - \frac{\sum_{\lambda=380}^{500} (\text{lens } T\% \times LED \text{ emission})}{\sum_{\lambda=380}^{500} LED \text{ emission}}$$

where Σ is a discrete or continuous i.e. integral sum operator, λ is the wavelength in nm, lens T % is the spectral transmittance of the lens in % and LED emission is the spectral distribution of a white light emitting diode. As the light cut factor is a weighted function of the light source, the exact type of light source is not relevant, as soon as the main emission peak of the light source is located in a range of wavelengths between 430 nm and 480 nm, in particular between 440 nm and 465 nm.

The calculated CutLED is also indicative of the capability of filtering the solar light as the solar spectrum also comprises a high level of emission in the 430 nm-480 nm range.

In an embodiment, LED emission is defined in % in the Cut LED formula above.

With a view to designing an effective ophthalmic filter for patients suffering from cataract, a study was firstly carried out with 30 subjects testing lens prototypes having various values of CutLED, 15 subjects of which were suffering from cataract and 15 subjects of which were age-matched control subjects.

The main criteria measured are the disability glare (e.g. visual performance under harsh light), the halo size i.e. light scattering and the intraocular light scattering.

The main disability glare measurement is the low contrast visual acuity under glare conditions. The device used is the EpiGlare® Tester. It comprises four LEDs and creates a circular and directional disability glare.

The subject has to read a low contrast acuity chart (10%) through the device, in monocular vision, in a dark room and with his best correction.

The measurements are carried out with all the tested filters i.e. with all the lens prototypes having various values of CutLED.

CutLED has been measured using the following LED emission % spectral distribution, corresponding to a LED 5500K (cold white).

| Wavelength (nm) | Spectral distribution |
|---|---|
| 380 | 0.001 |
| 385 | 0.002 |
| 390 | 0.002 |
| 395 | 0.002 |
| 400 | 0.004 |
| 405 | 0.008 |
| 410 | 0.021 |
| 415 | 0.053 |
| 420 | 0.129 |
| 425 | 0.28 |
| 430 | 0.501 |
| 435 | 0.768 |
| 440 | 0.969 |
| 445 | 0.956 |
| 450 | 0.68 |
| 455 | 0.375 |
| 460 | 0.216 |
| 465 | 0.139 |
| 470 | 0.092 |
| 475 | 0.066 |
| 480 | 0.055 |
| 485 | 0.055 |
| 490 | 0.07 |
| 495 | 0.101 |
| 500 | 0.152 |
| 505 | 0.218 |
| 510 | 0.288 |
| 515 | 0.352 |
| 520 | 0.404 |
| 525 | 0.443 |
| 530 | 0.472 |
| 535 | 0.491 |
| 540 | 0.498 |
| 545 | 0.502 |
| 550 | 0.503 |
| 555 | 0.502 |
| 560 | 0.497 |
| 565 | 0.489 |
| 570 | 0.481 |
| 575 | 0.467 |
| 580 | 0.456 |
| 585 | 0.441 |
| 590 | 0.425 |
| 595 | 0.405 |
| 600 | 0.383 |
| 605 | 0.36 |
| 610 | 0.334 |
| 615 | 0.31 |
| 620 | 0.285 |
| 625 | 0.261 |
| 630 | 0.237 |
| 635 | 0.214 |
| 640 | 0.195 |
| 645 | 0.174 |
| 650 | 0.156 |
| 655 | 0.139 |
| 660 | 0.123 |
| 665 | 0.109 |
| 670 | 0.096 |
| 675 | 0.086 |
| 680 | 0.075 |
| 685 | 0.066 |
| 690 | 0.058 |
| 695 | 0.051 |
| 700 | 0.044 |
| 705 | 0.039 |
| 710 | 0.034 |
| 715 | 0.03 |
| 720 | 0.026 |
| 725 | 0.023 |
| 730 | 0.02 |
| 735 | 0.018 |
| 740 | 0.015 |
| 745 | 0.013 |
| 750 | 0.012 |
| 755 | 0.01 |
| 760 | 0.009 |
| 765 | 0.008 |
| 770 | 0.007 |
| 775 | 0.006 |
| 780 | 0.005 |

A first measurement with a clear lens gives the reference level of low contrast vision under glare conditions.

Then the subject carries out the same task with all the tested filters under glare conditions in a randomized way.

After each measurement, the subject is asked to give a subjective evaluation of his comfort on a scale ranging from 0 to 10. In the last part of the measurement, the subject evaluates with each tested filter the sharpness of a five-letter line and he gives for each one a rating from 0 to 10 too. The task is carried out three times with each tested filter.

For measuring the halo size i.e. light scattering, each subject sits down in a dark room, in front of a bright light situated in the middle of a screen. The subject is 4 meters away from the screen, in monocular vision and with his best correction. The bright light creates a diffusing light area i.e. a halo which increases with the cataract severity. By means of a pad, the subject has to adapt a circle to the halo size.

The measurement is carried out three times with each tested filter in a randomized way. The subject rates his comfort with each filter, on the same scale as for the previous measurements.

This test allows to identify the filters, if any, that improve vision by reducing the halo size, e.g. the light scattering that causes glare and hazy vision.

Last, a C-Quant (Oculus) device is used in order to measure intraocular light scattering. The subject looks at a circle cut in two parts and he has to determine which part is the most blinking or glittering. This measurement is carried out with all the tested filters.

Beyond blue light filtering solutions, a red cut lens prototype was tested, as well as an optical density lens prototype, i.e. a lens having a flat spectral transmittance over the visible range.

Figure 7:
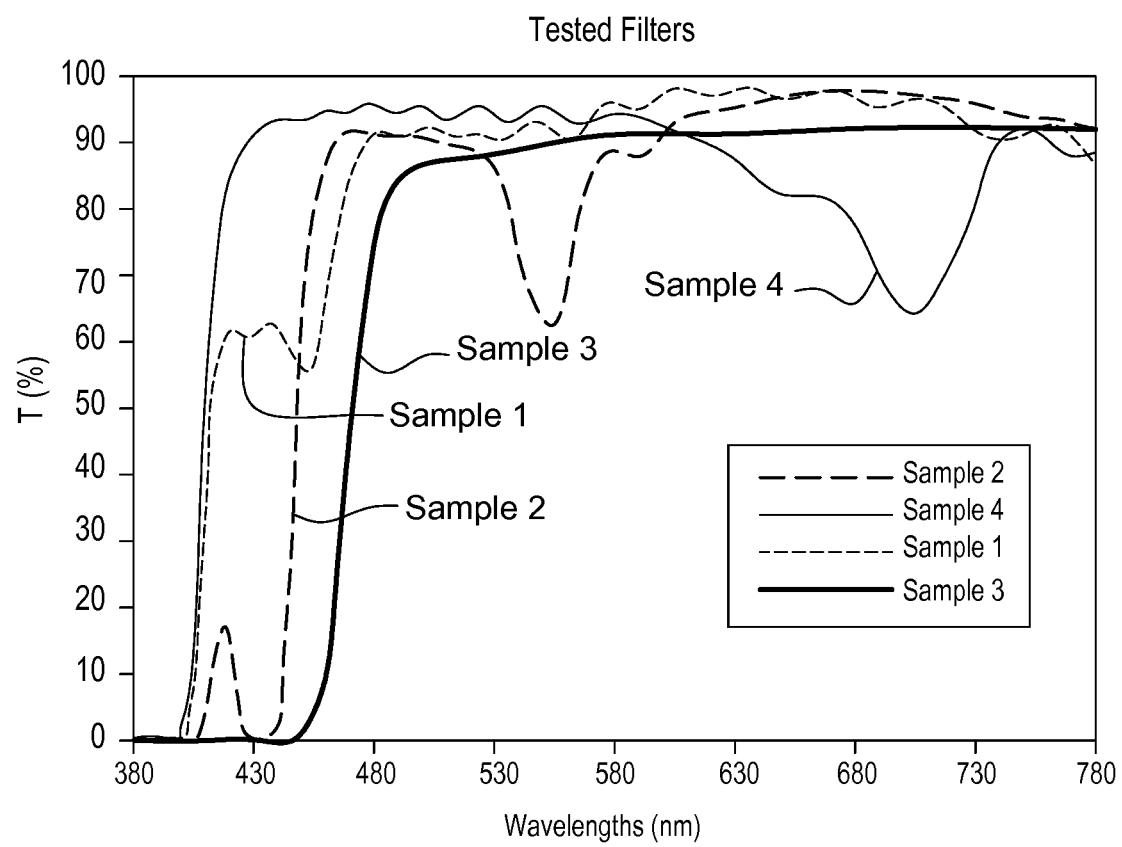
FIG. 7 is a set of graphs showing the transmission spectra of ophthalmic lens prototypes tested during a preliminary study.

FIG. 7 shows the transmission spectra, i.e. the spectral transmittance T in % as a function of the wavelength in nm, of four tested ophthalmic lens prototypes, referred to as "sample 1" to "sample 4".

The table below lists for each tested sample, as well as for a clear lens and an optical density lens, the value of CutLED in %, the rated aesthetics, whether the sample was judged by the patients as being effective or not to improve vision and the final rating for each lens. The tested lenses were coated on both sides with an antireflective coating (AR1 front side and AR2 back side (or rear side)(same as those defined in example 1 hereafter)) and were not color-balanced.

| | CutLED (%) | aesthetics | effective/ not effective | final rating |
|---|---|---|---|---|
| Clear lens (reference) | 2 | ++ | no | / |
| Sample 1 (invention) | 37 | +/− | effective | acceptable |
| Sample 2 | 69 | −− | effective | hardly acceptable, while effective for improving vision, because of the limited visual transmittance (close to class 1) and aesthetics, not adapted for a permanent wear |
| Sample 3 (comparative) | 95 | −−− | very limited efficiency | not acceptable because of the limited efficiency and the pronounced dark-yellow color |
| Sample 4 (comparative) | 15 | + | no | not acceptable because not effective |
| Optical density (comparative) | 10 | + | no | not acceptable because not effective |

The aesthetics rate "++" means very good, well acceptance, "+" means good acceptance, "+/−" means low acceptance, "−−" means very low acceptance and "−−−" mean not acceptable.

Samples 1 and 2 significantly decrease the disability glare and decrease by 20% the light scattering (only for patients suffering from cataract). Under bothering lights, the cataract subjects with samples 1 and 2 recover a visual performance equal to the one of the tested control subjects exposed to the same harsh light.

Moreover, samples 1 and 2 decrease the intraocular scattering for cataract people only.

Sample 3 does not give any improvement in light scattering, probably because it decreases too much the visual transparency but improves comfort. It is to be noted that sample 3 is corresponding to a lens according to Mutzhas U.S. Pat. No. 5,235,358.

The tested filters show no benefit for age-matched control subjects.

The lack of efficiency of sample 4, which is a red cut prototype, and of the optical density prototype proves the specific impact of blue light in disability glare of patients suffering from cataract.

The color (aesthetics) of the acceptable lenses is not so much appreciated, even if sample 1 is preferred with respect to sample 2. This shows the need to improve the aesthetics of the filters with color balancing.

Also, a too high level of CutLED, impacting significantly the color perception and transparency, is not a relevant solution.

Sample 1 was the best compromise.

The ophthalmic lens for improving vision according to the invention has a light cut factor CutLED between 32% and 90%, for wavelengths ranging from 380 nm to 500 nm.

The CutLED value of 32% is considered as the minimum value needed to be effective on glare and the CutLED value of 90% is considered as a maximum value beyond which efficiency is lower with very poor aesthetics and/or too low transparency.

Preferable ranges for CutLED are 32% to 80%, preferably 32% to 75%, more preferably 32% to 70%, even more preferably 32% to 65%; 32% to 60%, 32% to 55%, 32% to 50%, 32% to 45%, 32% to 40%.

Other preferred ranges for CutLED are 34% to 80%, preferably 34% to 75%, more preferably 34% to 70%, even more preferably 34% to 65%; 34% to 60%, 34% to 55%, 34% to 50%, 34% to 45%, 34% to 40%.

Other preferred ranges for CutLED are 35% to 55%, more preferably 38% to 52%, even more preferably 40% to 50%.

Moreover, the ophthalmic lens according to the invention has a mean luminous transmittance Tv in the visible range higher than or equal to 75%, more preferably higher than or equal to 80%.

Besides, light transmitted through the ophthalmic lens according to the invention has a colorimetric value b*, as defined in the colorimetric CIE L*a*b* with illuminant D65, lower than 25.

A method for obtaining an ophthalmic lens according to the invention comprises a step of tinting the lens, by applying a sublimation process, an imbibition process, a dip coating process, a lamination process or by mixing a light absorbing dye in a substrate composition.

Those embodiments will be described in a more detailed manner hereafter.

Light cut can be achieved by light absorbing compounds i.e. tint.

The light absorbing compound is preferably chosen from a colorant, such as a dye or a pigment, or mixtures thereof. Suitable examples of dyes, pigments and colorants are compounds belonging to the azo or rhodamine or cyanine or polymethine or merocyanine or fluorescein or pyrylium or porphyrin or phthalocyanine or perylene or coumarin or acridine or indolenin or indol-2-ylidene or benzanthrone or anthrapyrimidine or anthrapyridone or benzotriazole or benzophenone or anthraquinone or triazine or oxalanilide families; metal-complexes such as a rare-earth cryptates or chelates; aluminates, silicates and aluminosilicates.

Preferred light absorbing dyes are chosen in the Color Index, for instance in the Teratop® commercial range, especially Teratop® Red NFR, Teratop® Yellow NFG, Teratop® Blue NFB (Huntsman) or in the Macrolex® series, especially Macrolex Red H, Macrolex Yellow G, Macrolex Violet 3R (Lanxess).

The light absorbing dyes may be located in the mass or bulk of the substrate of the lens or may be located in a thin layer of the mass of the substrate (in the subsurface), or, as a variant, may be located in a coating or a laminate deposited on a substrate of the lens. Coatings may be any kind of wet coatings. For laminates, any process may be used, including the use of a coloured wafer of material placed in a mould prior to injection or casting of a lens, or the transfer of a laminate from a carrier onto a lens, or the deposition of a laminate onto a lens with an adhesive.

Therefore, a method for obtaining an ophthalmic lens according to the invention in which dyes are located in the mass or bulk of the substrate of the lens comprises a step of tinting the lens by mixing a light absorbing dye in a polymerizable composition, which yields the substrate upon polymerization.

Alternatively, a method for obtaining an ophthalmic lens according to the invention in which dyes are located in a thin layer of the mass of the substrate of the lens comprises a step of tinting the lens by applying a sublimation process and/or by applying an imbibition process.

In both methods, the substrate is provided then put in contact with dyes in such a way that dyes can diffuse inside the substrate. As a result, a thin layer of the substrate comprises dyes and the substrate is tinted.

In a sublimation process, dyes are deposited on the substrate by sublimation; then the substrate is kept in a warm environment for a determined time so that dyes can diffuse in the substrate; and finally the substrate is cleaned to remove excess dyes still deposited on the surface.

In an imbibition process, the substrate is immersed in a hot liquid bath comprising dyes; then left in the bath for a determined time so that dyes can diffuse in the substrate; and finally the substrate is extracted from the bath and cleaned to remove residual liquid.

Last, a method for obtaining an ophthalmic lens according to the invention in which dyes are located in a coating deposited on a substrate of the lens comprises a step of applying a liquid coating, either by dip coating or spray coating or spin coating or any well know coating method. In this method, a coating composition comprising dyes is provided, applied on the substrate by dip, spray or any other suitable method, then cured by heat and/or actinic radiations, in particular UV rays.

In addition or as a variant to light absorbing dyes, the lens may comprise at least one light reflection filter rejecting at least partially blue light at an angle of incidence lower than or equal to 17°, preferably lower than or equal to 15°.

Such light reflection filters may be interferential coatings on at least one face of the lens, preferably on both.

In a particular embodiment, the lens comprises at least one light absorbing dye and at least one light reflection filter rejecting at least partially blue light at an angle of incidence lower than or equal to 17°, preferably lower than or equal to 15°.

Moreover, when filtering by a combination of absorption and an interferential multilayer coating, the multilayer coating may be optimized in order to have maximum reflection at 450 nm on the convex face of the lens and minimum reflection at 450 nm on the concave face of the lens.

In a particular embodiment, the transmission spectrum of the lens has a minimum spectral transmittance value in the wavelength range 400 nm-460 nm, preferably in the wavelength range 440 nm-460 nm, more preferably in the wavelength range 445 nm-455 nm.

In that embodiment, according to particular features, the transmission spectrum may be such that the spectral transmittance has an increase by at least 20%, preferably by 30%, from a wavelength in the range 420 nm-460 nm up to around a wavelength of 480 nm, such increase being followed by at least a first plateau for wavelengths between 480 nm and 560 nm, where the difference between the lowest and the highest spectral transmittance values for wavelengths between 480 nm and 560 nm does not exceed 12%, and preferably the first plateau may be followed by a second plateau for wavelengths between 580 nm and 700 nm, where the difference between the lowest and the highest spectral transmittance values for wavelengths between 580 nm and 700 nm does not exceed 12%.

In a particular embodiment, the spectral transmittance of the lens at a wavelength of 480 nm is higher than the spectral transmittance of the lens at all wavelengths ranging from 420 nm to 460 nm.

In a particular embodiment, the transmission spectrum of the lens has a minimum spectral transmittance value in the wavelength range 510 nm-530 nm and/or in the wavelength range 540 nm-570 nm.

In a particular embodiment, the spectral transmittance of the lens is between 28% and 75% at all wavelengths between 420 nm and 460 nm, i.e. between 28% and a value lower than 35% or between 35% and 75% at all wavelengths between 420 nm and 460 nm.

In a particular embodiment, the spectral transmittance of the lens is between 30% and 75% at all wavelengths between 420 nm and 460 nm, i.e. between 30% and a value lower than 35% or between 35% and 75% at all wavelengths between 420 nm and 460 nm, preferably between 32% and 75%, more preferably between 30% and 50%, even more preferably between 30% and 45% at all wavelengths between 420 nm and 460 nm, more preferably at all wavelengths between 420 nm and 450 nm.

In a particular embodiment, the spectral transmittance of the lens is between 35% and 75% at all wavelengths between 420 nm and 460 nm.

In a particular embodiment, the spectral transmittance of the lens is lower than or equal to 75%, preferably lower than or equal to 70%, more preferably ranging from 55% to 70%, at a wavelength of 450 nm, which corresponds to the irradiance peak of LED artificial lighting, such as a LED car headlight.

In a particular embodiment where the lens is tinted by dip tinting, the spectral transmittance of the lens is monotonically increasing for wavelengths from 400 nm to 460 nm, preferably from 410 nm to 460 nm.

In a particular embodiment, the spectral transmittance of the lens is lower than 95%, preferably lower than 90%, at all wavelengths between 480 nm and 520 nm, preferably between 480 nm and 510 nm.

According to a particular feature, the ratio between the lowest spectral transmittance value of the lens in the wavelength range 420 nm-460 nm and the lowest spectral transmittance value of the lens in the wavelength range 480 nm-780 nm may be lower than 0.7.

Preferably, lenses according to the invention have a front face and a rear face and at least one of said faces, preferably the two faces, have an antireflection coating.

The antireflection coating confers to the corresponding face a luminous reflectance Rv lower than 2.5% per face, preferably lower than 1.5%, more preferably lower than 1% and optimally lower than or equal to 0.6%.

As used herein, the rear (or the inner) face of the substrate is intended to mean the face which, when using the lens, is the nearest from the wearer's eye. It is generally a concave face. On the contrary, the front face of the substrate is the face which, when using the article, is the most distant from the wearer's eye. It is generally a convex face.

The "mean light reflection factor" or luminous reflectance noted Rv, is such as defined in the ISO 13666:1998 Standard, and measured in accordance with the ISO 8980-4 Standard (for an angle of incidence lower than 17°, typically of 15°, i.e. this is the weighted spectral reflection average over the whole visible spectrum between 380 nm and 780 nm.

The following examples illustrate the present invention in a non-limiting manner.

EXAMPLES

In Example 1, a tinting process through a sublimation technique was applied. The tinting recipe was balanced to achieve a value of CutLED of 37%, a mean luminous transmittance in the visible range Tv higher than or equal to 82% and colorimetric values a* and b* as low as possible.

In Example 2, a polycarbonate (PC) bulk tinting process was applied, and a hard coating and an antireflective coating were applied on each face of the lens. The target was to achieve a value of CutLED of 39% for an uncoated lens or 37% for an HMC (Hard Multi-Coating) lens, a value of Tv of 78% for an uncoated lens or 82% for an HMC lens and colorimetric values a* and b* as low as possible.

In Example 3, a tinting process using an imbibition method was applied.

Example 1

This example describes the preparation of lenses according to the invention obtained by a sublimation process.

The ophthalmic lenses according to example 1 comprise a lens substrate having a refractive index of 1.60 (MR8®) material from MITSUI.

The lenses according to the invention were designed with the target of achieving a value of CutLED of 37%, a mean luminous transmittance in the visible range Tv higher than or equal to 82% and colorimetric values a* and b* as low as possible.

Predictions of recipes (mainly ratio of dyes) for a tinting process by sublimation were performed by using databases regarding the transmittance spectrum as a function of the substrate and of the tinting inks and databases regarding the physical properties of thin layers of hard coating and antireflective coating.

Sublimation Method:

In this section, the preparation of lenses corresponding to lenses 1 to 6 is described.

Dyes are deposited by sublimation on lens substrates:
a mixture of three sublimable dyes (blue, yellow and red to yield a brown colour) is printed on a specific paper,
dyes are transferred from the specific paper to the concave side of the lens by sublimation,
for each lens, the ratio of each dye is adjusted to get the required spectrum. with the desired tint, blue and red dyes fulfilling the function of color balancing agents,
the lens is finally heated so that dyes diffuse in the mass of the lens (imbibing step).

This first step is described in details in patent applications EP1249334, EP1388607, EP1298483, EP1367412, EP1237035 and EP1122355.

A primer coating (based on PU (polyurethane) latex containing high index colloids such as $SnO_2$, a hard coating passed on polysiloxane including high index colloids, an antireflective (AR) coating are then deposited in this order on the front face and on the rear face of the lens.

The lens coated on its rear and front faces with a conventional anti-abrasion and scratch-resistant coating is placed into a vacuum deposition chamber, a step of pumping until obtaining a high-vacuum is implemented, then a step of activating the surface of the substrate by means of an argon ion beam (anode current: 1 A, anode voltage: 100 V, neutralization current: 130 mA) is implemented, followed by the following steps: turning the ion irradiation off, then forming subsequently the various layers of the antireflective coatings by successive evaporations and at last implementing a ventilation step.

An AR coating (defined as AR1) as described in example 6 of WO2008107325 is applied on the front face of a lens. An AR coating (defined as AR2) corresponding to example 1 of WO2012076714 is applied on the concave (cc) face of the lens.

In certain examples, an AR coating known as SeeCoat Blue™ AR from Nikon Essilor is applied on the lens. This lens, due to the presence of SeeCoat Blue™ has a partial reflection in the blue range.

In lenses 5 and 6, CutLED results from a combination of AR coatings partially reflecting blue light and absorbing dyes.

The layers of the antireflective coatings were deposited without heating the substrates by evaporation under vacuum (evaporation source: electron gun).

The deposition apparatus is typically a Leybold 1104 machine fitted with an electron gun (ESV14 (8 kV)) for evaporating oxides, and provided with an ion gun (Commonwealth Mark II) for the preliminary phase to prepare the surface of the substrate using argon ions (IPC).

The thickness of the layers can be controlled by means of a quartz microbalance. The spectral measurements were effected on a variable incidence-spectrophotometer Perkin-Elmer Lambda 850 with an URA accessory (Universal Reflectance Accessory).

Light cut was mainly achieved through absorption.

The table below summarizes the main characteristic values obtained via measurements for each lens configuration, as well as the recipes for the tinting process by sublimation. A convex coating is referred to as "cx" and a concave coating is referred to as "cc".

|  | lens 1 | lens 2 | lens 3 | lens 4 | lens 5 | lens 6 |
|---|---|---|---|---|---|---|
| Substrate | Primer/ Hard coat + AR1 (cx) + AR2 (cc) | Primer/ Hard coat + AR1 (cx) + AR2 (cc) | Primer/ Hard coat + AR1 (cx) + AR2 (cc) | Primer/ Hard coat + AR1 (cx) + AR2 (cc) | Primer/Hard coat + Seecoat blue (cx) + Seecoat blue with low UV reflection (cc) | Primer/Hard coat + Seecoat blue (cx) + Seecoat blue with low UV reflection (cc) |

-continued

|  | lens 1 | lens 2 | lens 3 | lens 4 | lens 5 | lens 6 |
|---|---|---|---|---|---|---|
| Recipe (red/yellow/blue) | Yellow dye as major dye | Yellow dye as major dye | Red dye as major dye | Yellow dye as major dye | Yellow dye as major dye | Yellow dye as major dye |
| Luminous transmission Tv D65 measured | 93.4 | 89.8 | 84.4 | 83.5 | 84.5 | 83.2 |
| a*measured | −5.1 | −3.8 | 1.4 | −1.8 | −3 | −2.2 |
| b* measured | 19.6 | 16.2 | 13 | 12.8 | 14.7 | 17.3 |
| CutLED measured | 38.4 | 36.4 | 36.1 | 37 | 38.1 | 43 |

FIG. 1 shows the transmission spectra, i.e. the spectral transmittance T in % as a function of the wavelength in nm, of the above six ophthalmic lens prototypes obtained by applying a tinting process by sublimation.

Example 2

This example describes the preparation of polycarbonate lenses obtained by using a bulk tinting process.

Ophthalmic lenses according to the invention were designed with the target of achieving a value of CutLED of 39% for an uncoated lens or 36% for a lens having an AR coating on both sides (CX, CC), a mean luminous transmittance in the visible range Tv of 78% for an uncoated lens or 82% for a lens coated with antireflection stacks on both sides and colorimetric values a* and b* in transmission as low as possible.

Method of Preparation (Bulk Process)
General Process:

Light absorbing dyes are blended with polycarbonate (PC) resin to create a "tinted" resin. This resin is subsequently injection molded to create the lens geometry. The tinted resin is prepared by tumbling the dyes in powder form with PC pellets to create a blend of uniformly coated pellets. This blend can either be injection molded directly (also known as direct injection) or first melt compounded and re-pelletized with an extrusion process such as a twin-screw co-rotating extruder. The advantages of compounding are to provide adequate mixing of the dyes into the PC resin without disturbing the optical lens injection molding process.

Following are the specific characteristics implemented for example 2:
Process=PC bulk process. Dyes were tumbled with PC resin pellets. Lenses were produced with direct injection of this blend.
PC Resin=Sabic RL7220
Barrel temp=590° F.
Lens=Finished plano, 2.0 mm center thickness
Functional Dye=ABS 549, from Exciton, at a concentration of 6.0 ppm For the PC bulk tinting process, Exciton dye ABS549 dye was selected, because it is compatible with polycarbonate and it is centered in the LED emission wavelength range i.e. between 420 nm and 470 nm, while slightly shifted towards shorter wavelengths, in order to color the lens as little as possible.
Color Balancing Dye=Transparent Violet 2BR (Color Index: Solvent Violet 31) from Dimacolor Industry Group Co., LTD, Concentration=11.2 ppm The same primer, hard coat and AR coating as in example 1 can be used.

A PC lens with dye ABS549 according to the invention has properties as listed in the two tables below.

| L*(10°) | a*(10°) | b*(10°) | C*(10°) | h*(10°) | Tv(%) D65, 2° |
|---|---|---|---|---|---|
| 96 | −4 | 14 | 14 | 107 | 90.7 |

| YIC(2°) | CutLED |
|---|---|
| 22 | 38 |

The yellowness index Yi is calculated based on the CIE tristimulus values X, Y, Z such as described in the standard ASTM E313 with illuminant C observer 2°. The yellowness index Yi is calculated per ASTM method E313 through the relation Yi=(127.69 X−105.92 Z)/Y, where X, Y and Z are the CIE tristimulus values.

Figure 2:
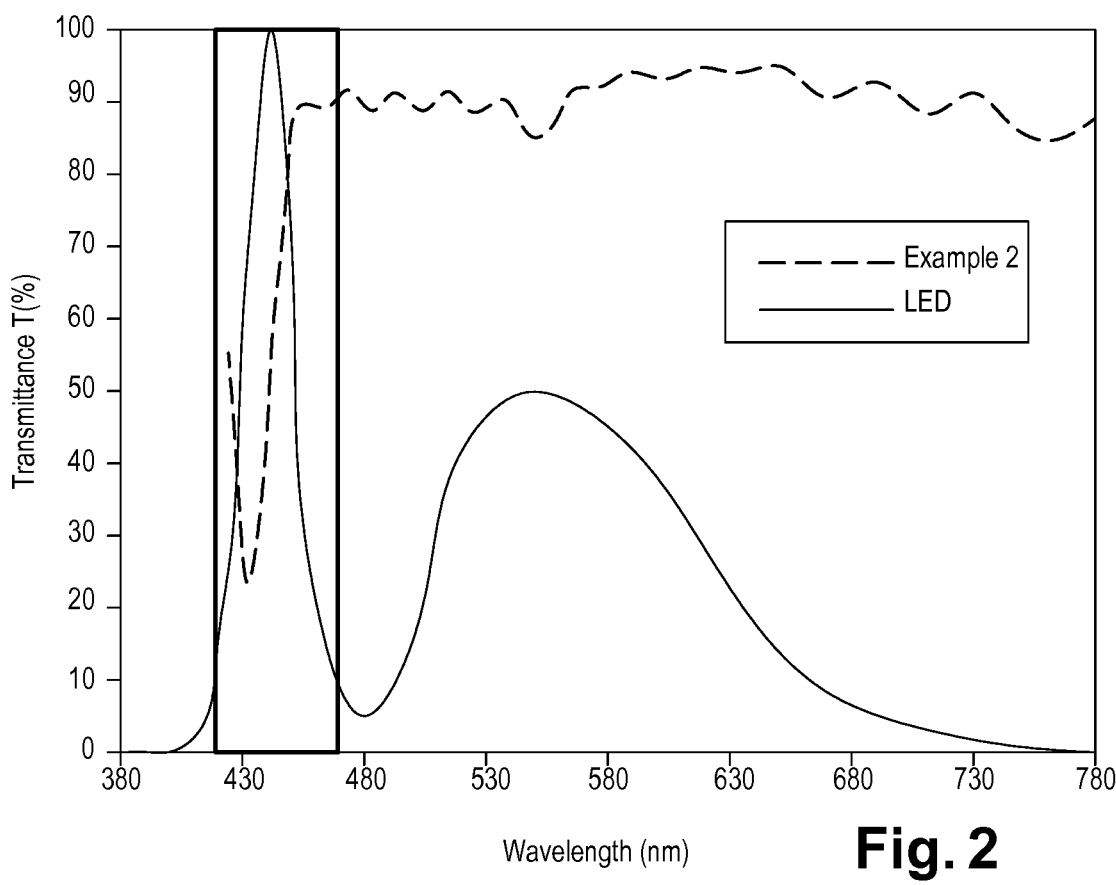
FIG. 2 is a graph showing the transmission spectra of an ophthalmic lens prototype according to the invention, in another particular embodiment, and of a LED light.

FIG. 2 shows the transmission spectra, i.e. the spectral transmittance T in % as a function of the wavelength in nm, of the above ophthalmic lens prototype obtained by applying a PC bulk tinting process and of a LED light.

In order to balance the color of the obtained ophthalmic lens, another dye is added. Thus, two color-balanced lenses are obtained: GREY, in which dye Epolight 5840 by EPOLIN has been added and GREY2, in which dye SV31 by DIMACOLOR INDUSTRY GROUP has been added.

The prototype GREY2 contains a polycarbonate resin RL7220, dye (into the bulk) ABS549 (5.95 ppm) and dye SV31 (10.70 ppm).

GREY and GREY2 have properties as listed in the two tables below.

| Lens | L*(10°) | a*(10°) | b*(10°) | C*(10°) | h*(10°) | Tv(%) D65, 2° |
|---|---|---|---|---|---|---|
| GREY | 92 | 1 | 7 | 7 | 83 | 81.0 |
| GREY2 | 92 | −2 | 5 | 6 | 108 | 81.5 |

| Lens | YIC(2°) | CutLED |
|---|---|---|
| GREY | 16 | 38 |
| GREY2 | 11 | 37 |

Figure 3:
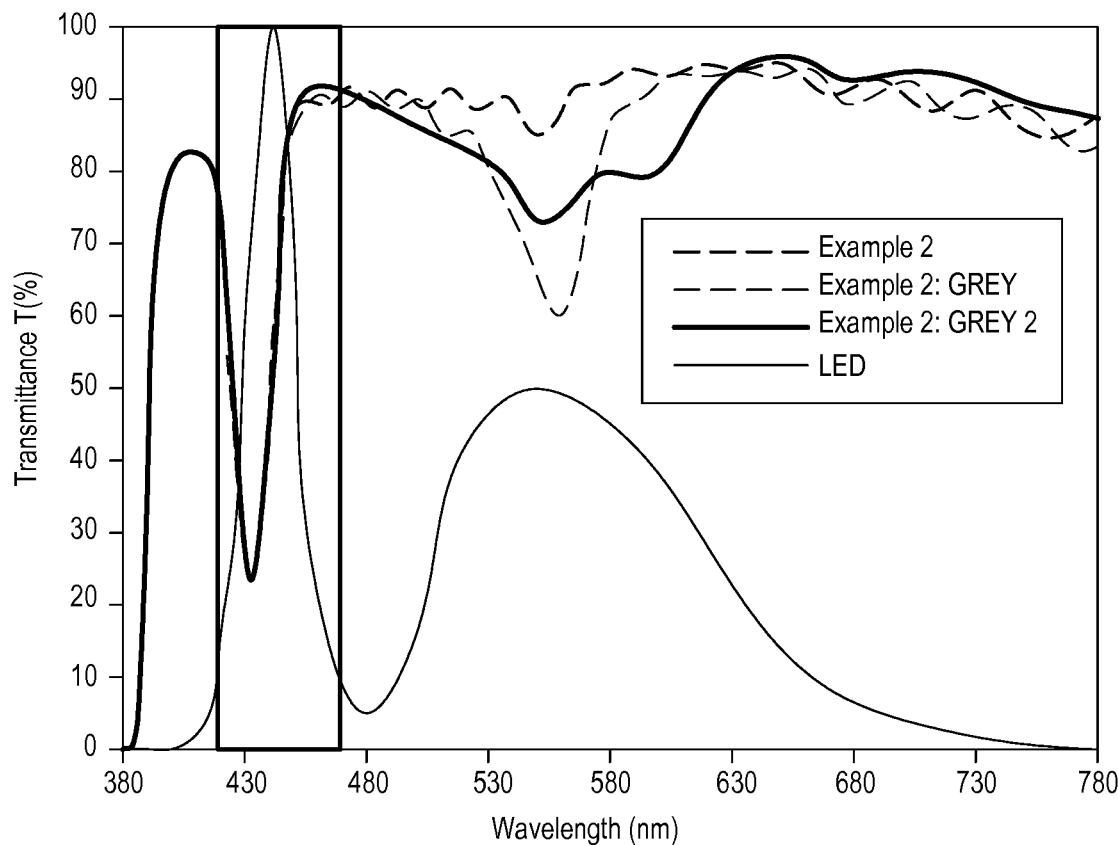
FIG. 3 is a set of graphs showing the transmission spectra of other prototypes according to the invention, in addition to the transmission spectra already shown in FIG. 2.

FIG. 3 shows the transmission spectra, i.e. the spectral transmittance T in % as a function of the wavelength in nm, of the above ophthalmic lens prototypes GREY and GREY2, in addition to the transmission spectra already shown in FIG. 2.

Example 3

In that example, filtering by absorption was achieved through a tinting process using an imbibition method.

A solution containing a mix of 3 primary dyes: TERATOP™ NFR+TERATOP™ NFG+TERATOP™ NFB is prepared in soft water with dispersant (Super NSI from Europizzi). The solution is heated at 94° C.

The ratio of the 3 primary dyes is adjusted according to the desired blue cut and desired tint.

Lens substrates (MR8® with a refractive index of 1.60 for sublimation prototype 1, MR7® with a refractive index of 1.67 for dip tinting prototypes 1 and 2 and Orma® from Essilor for sublimation prototypes 2 and 3 and for dip tinting prototypes 2 and 3) are soaked in the solution. The tinting time is depending on the desired grade. The darker is the desired grade, the longer will be the tinting time. The imbibition time is adapted to reach required value of Tv.

Then, lenses are withdrawn from the bath, laid on a tray, then placed in an oven for 1 hour at 100° C.±3° C.

The table below gives a comparison between the characteristics of three uncoated prototypes tinted by sublimation and similar uncoated prototypes (no primer, no hard coat, no AR coating) tinted by dip tinting.

|  | Sublimation prototype 1 | Dip tinting prototype 1 - trial 1 | Dip tinting prototype 1 - trial 2 | Sublimation prototype 2 | Dip tinting prototype 2 | Sublimation prototype 3 | Dip tinting prototype 3 |
|---|---|---|---|---|---|---|---|
| Tv D65 | 84.12 | 83.49 | 82.53 | 77.87 | 77.61 | 83.28 | 83.76 |
| CutLED (%) | 43.4 | 45.4 | 43 | 40.2 | 34.6 | 40.3 | 36.3 |
| Tv at 450 nm | 49.9 | 54.9 | 57.4 | 55.8 | 67.3 | 55.3 | 65.8 |
| a* | −6.0 | −5.1 | −3.8 | 1.6 | 3.5 | −2.9 | −1.9 |
| b* | 18.9 | 21.1 | 18.7 | 11.3 | 8.6 | 14.4 | 13.5 |

Figure 4:
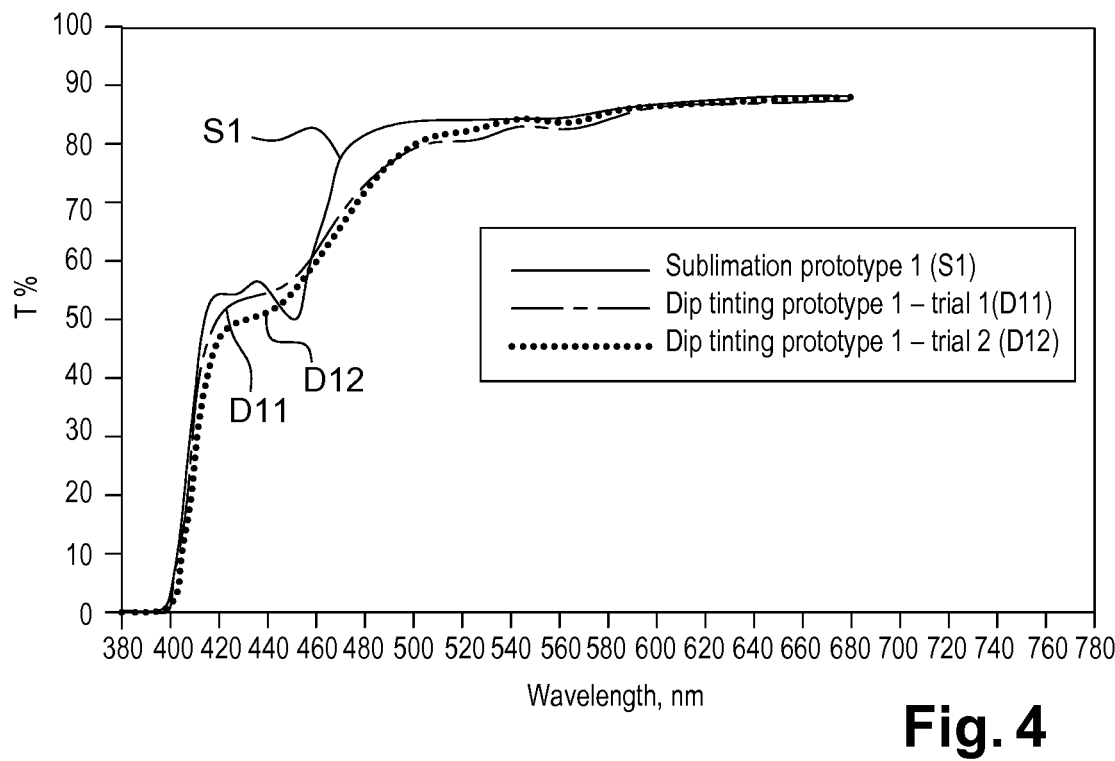
FIGS. 4, 5 and 6 are sets of graphs showing the transmission spectra of other prototypes according to the invention, in another particular embodiment.
Figure 5:
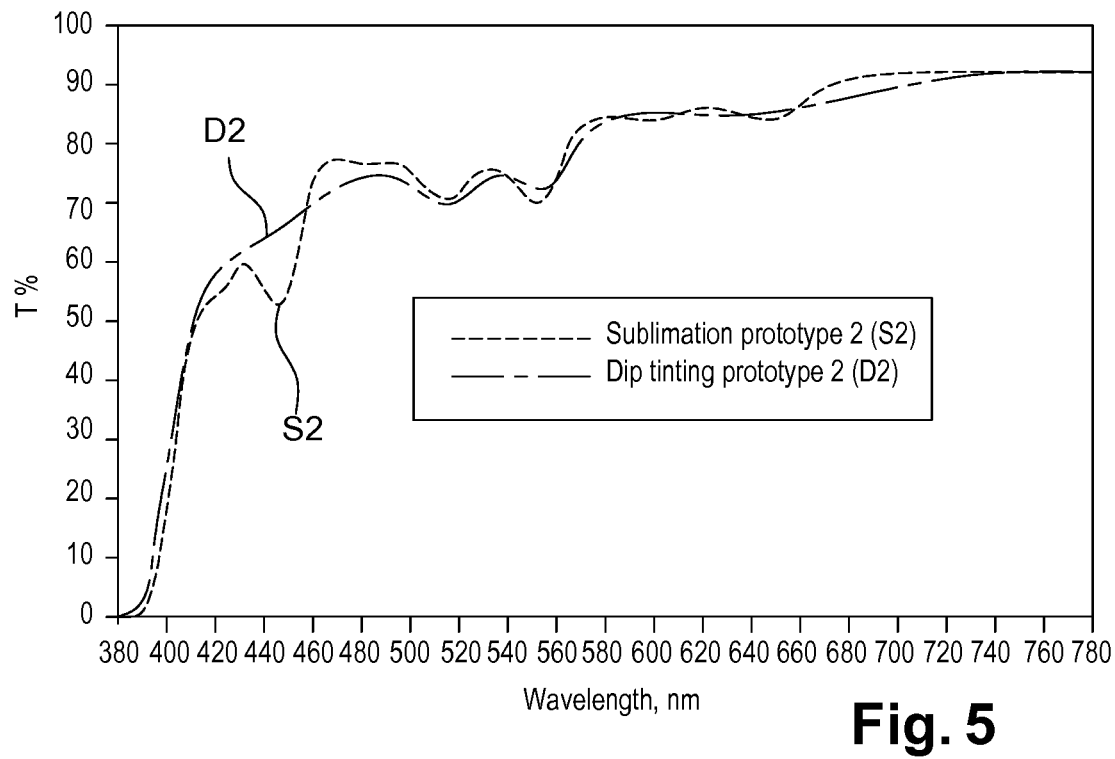
Figure 6:
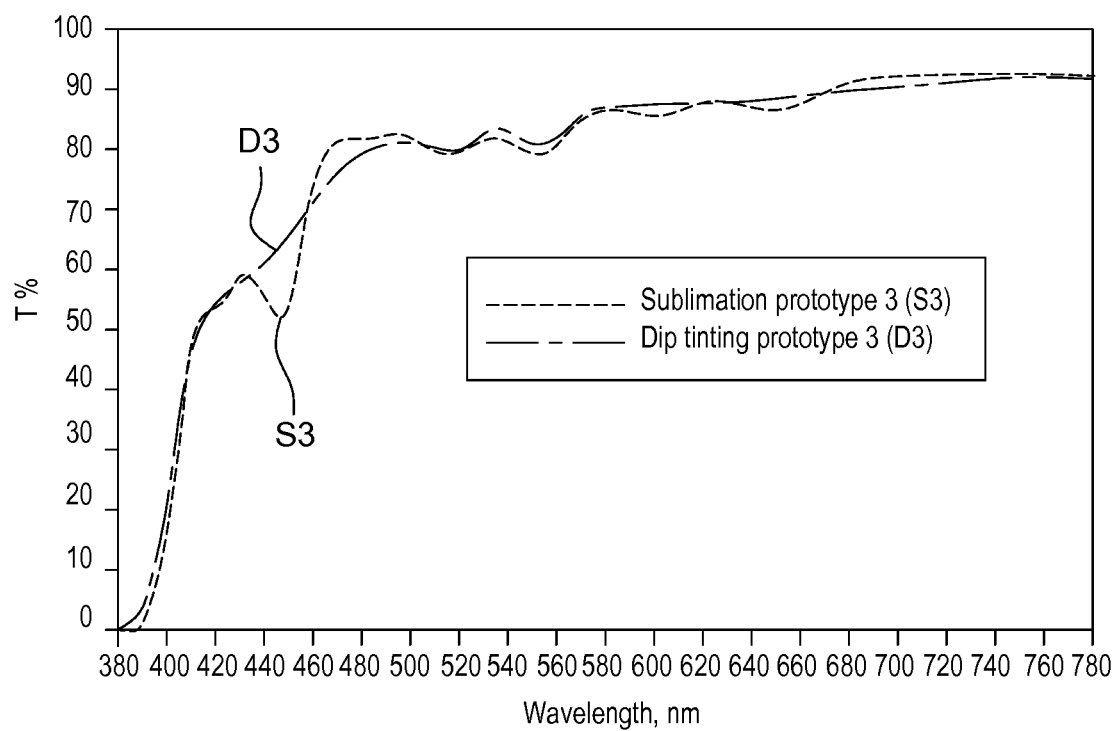

FIGS. 4, 5 and 6 show the transmission spectra, i.e. the spectral transmittance T in % as a function of the wavelength in nm, of the above seven prototypes.

Besides, in filtering by a combination of absorption and an interferential multilayer, the interferential multilayer coating may be optimized in order to have maximum reflection at 450 nm on the convex face of the lens and minimum reflection at 450 nm on the concave face of the lens.

Although representative processes and articles have been described in detail herein, those skilled in the art will recognize that various substitutions and modifications may be made without departing from the scope of what is described and defined by the appended claims.

For example, the invention has been described for an ophthalmic lens, but could also be applied on an optical article, preferably an optical lens.

The invention claimed is:

1. An ophthalmic lens for improving vision, comprising:
a light cut factor CutLED between 32% and 90%, for wavelengths ranging from 380 nm to 500 nm, defined by:

$$CutLED = 100 - \frac{\sum_{\lambda=380}^{500} (\text{lens } T \% \times LED \text{ emission})}{\sum_{\lambda=380}^{500} LED \text{ emission}}$$

wherein $\Sigma$ is a discrete or continuous sum operator, $\lambda$ is the wavelength in nm, lens T % is a spectral transmittance of said lens in % and LED emission is a spectral distribution of a white light emitting diode;
a mean luminous transmittance in the visible range higher than or equal to 75%; and
light transmitted through said ophthalmic lens has a colorimetric value b*, as defined in colorimetric CIE L*a*b* system with illuminant D65, lower than 25;
wherein the ophthalmic lens comprises at least one light absorbing dye and/or at least one light reflection filter rejecting at least a portion of blue light at an angle of incidence lower than or equal to 15°.

2. The ophthalmic lens according to claim 1, wherein the transmission spectrum of said lens has a minimum spectral transmittance value in the wavelength range 400 nm-460 nm.

3. The ophthalmic lens according to claim 2, wherein the transmission spectrum of said lens has a minimum spectral transmittance value in the wavelength range 440 nm-460 nm.

4. The ophthalmic lens according to claim 3, wherein the transmission spectrum of said lens has a minimum spectral transmittance value in the wavelength range 445 nm-455 nm.

5. The ophthalmic lens according to claim 1, wherein the spectral transmittance of said lens is between 28% and 75% at all wavelengths between 420 nm and 460 nm.

6. The ophthalmic lens according to claim 1, wherein the spectral transmittance of said lens is between 30% and 75% at all wavelengths between 420 nm and 460 nm.

7. The ophthalmic lens according to claim 1, wherein the spectral transmittance of said lens is between 35% and 75% at all wavelengths between 420 nm and 460 nm.

8. The ophthalmic lens according to claim 1, wherein the spectral transmittance of said lens is lower than or equal to 75%, at a wavelength of 450 nm.

9. The ophthalmic lens according to claim 8, wherein the spectral transmittance of said lens is lower than or equal to 70%, at a wavelength of 450 nm.

10. The ophthalmic lens according to claim 9, wherein the spectral transmittance of said lens ranges from 55% to 70%, at a wavelength of 450 nm.

11. The ophthalmic lens according to claim 1, wherein the spectral transmittance of said lens is monotonically increasing for wavelengths from 400 nm to 460 nm.

12. The ophthalmic lens according to claim 11, wherein the spectral transmittance of said lens is monotonically increasing for wavelengths from 410 nm to 460 nm.

13. The ophthalmic lens according to claim 1, wherein the spectral transmittance of said lens is lower than 95%, at all wavelengths between 480 nm and 520 nm.

14. The ophthalmic lens according to claim 13, wherein the spectral transmittance of said lens is lower than 95%, at all wavelengths between 480 nm and 510 nm.

15. The ophthalmic lens according to claim 13, wherein the spectral transmittance of said lens is lower than 90%, at all wavelengths between 480 nm and 520 nm.

16. The ophthalmic lens according to claim 1, wherein the spectral transmittance of said lens at a wavelength of 480 nm is higher than the spectral transmittance of said lens at all wavelengths ranging from 420 nm to 460 nm.

17. The ophthalmic lens according to claim 1, wherein the transmission spectrum of said lens has a minimum spectral transmittance value in the wavelength range 510 nm-530 nm and/or in the wavelength range 540 nm-570 nm.

18. The ophthalmic lens according to claim 1, wherein the ratio between the lowest spectral transmittance value of said lens in the wavelength range 420 nm-460 nm and the lowest spectral transmittance value of said lens in the wavelength range 480 nm-780 nm is lower than 0.7.

19. The ophthalmic lens according to claim 1, wherein the at least one light reflection filter is an interferential coating on at least one face of said lens.

\* \* \* \* \*